United States Patent
Chang

(10) Patent No.: US 10,225,388 B2
(45) Date of Patent: Mar. 5, 2019

(54) METHOD AND APPARATUS FOR ADJUSTING VOLUME OF AN ACCEPTED SESSION

(71) Applicant: HISENSE MOBILE COMMUNICATIONS TECHNOLOGY CO., LTD., Qingdao (CN)

(72) Inventor: Xuejian Chang, Qingdao (CN)

(73) Assignees: Hisense Mobile Communications Technology Co., Ltd., Qingdao (CN); Hisense USA Corporation, Suwanee, GA (US); Hisense International Co., Ltd., Qingdao (CN)

( * ) Notice: Subject to any disclaimer, the term of this patent is extended or adjusted under 35 U.S.C. 154(b) by 0 days.

(21) Appl. No.: 15/276,249

(22) Filed: Sep. 26, 2016

(65) Prior Publication Data

US 2017/0279946 A1    Sep. 28, 2017

(30) Foreign Application Priority Data

Mar. 23, 2016    (CN) .......................... 2016 1 0172509

(51) Int. Cl.
*H04M 1/60*    (2006.01)
*H04R 29/00*    (2006.01)

(52) U.S. Cl.
CPC ........ *H04M 1/6016* (2013.01); *H04R 29/001* (2013.01); *H04R 2430/01* (2013.01)

(58) Field of Classification Search
CPC ............ H04M 1/6016; H04M 1/6033; H04M 11/6041; H04M 1/7253; H04M 1/72569;
(Continued)

(56) References Cited

U.S. PATENT DOCUMENTS 9,350,869 B1 *  5/2016  Lasser .................. H04M 3/568
2014/0185831 A1  7/2014  Tsai
(Continued)

FOREIGN PATENT DOCUMENTS

CN    103139351 A    6/2013
CN    104104775 A    10/2014
(Continued)

OTHER PUBLICATIONS

Office Action from Chinese Application No. 201610172509.3 dated Oct. 26, 2018 (12 pages).

*Primary Examiner* — Thanh Le
(74) *Attorney, Agent, or Firm* — Harness, Dickey & Pierce, P.L.C.

(57) ABSTRACT

Some embodiments of the disclosure disclose a method and apparatus for adjusting volume of an accepted session on a mobile communication terminal. The method includes: determining, by the mobile communication terminal transmitting a delivered session, a volume decibel value of the delivered session, and a volume decibel level corresponding thereto; and upon reception of an accepted session, adjusting the volume decibel value of the accepted session to a corresponding target volume decibel value according to a preset mapping relationship between the volume decibel level of the delivered session and the target volume decibel value of the accepted session.

18 Claims, 5 Drawing Sheets

(58) Field of Classification Search
CPC ... H04M 3/568; H04R 29/001; H04R 29/004; G06F 3/165; H03G 3/04; H03G 3/20
See application file for complete search history.

(56) References Cited

U.S. PATENT DOCUMENTS

| | | | | |
|---|---|---|---|---|
| 2014/0240595 | A1* | 8/2014 | DiNunzio | H03G 3/04 348/484 |
| 2016/0379613 | A1* | 12/2016 | Liu | G06F 3/165 381/57 |
| 2018/0074784 | A1* | 3/2018 | Tsukada | G06F 3/165 |

FOREIGN PATENT DOCUMENTS

| | | |
|---|---|---|
| CN | 104427083 A | 3/2015 |
| WO | WO-2015013446 A1 | 1/2015 |

* cited by examiner

METHOD AND APPARATUS FOR ADJUSTING VOLUME OF AN ACCEPTED SESSION

CROSS-REFERENCE TO RELATED APPLICATION

This application claims the benefit and priority of Chinese Patent Application No. 201610172509.3 filed Mar. 23, 2016. The entire disclosure of the above application is incorporated herein by reference.

FIELD

The present disclosure relates to the field of smart electronics, and particularly to a method and apparatus for adjusting volume of an accepted session.

BACKGROUND

This section provides background information related to the present disclosure which is not necessarily prior art.

During a user communicating with another user through a mobile communication terminal, the user typically fails to hear clearly a session of the other user due to interference of a surrounding environment, or his or her hearing impairment, or the user may hear the session of the other user with such a high volume in a relatively quiet environment that he or she has to adjust manually the volume on his or her mobile communication terminal, thus degrading the experience of the user.

For example, a user A communicating with a user B may not hear clearly a session of the user B due to a noisy surrounding environment of the user A, so the user has to adjust manually the volume on his or her mobile communication terminal, where the session of the user B heard by the user A is referred to as an accepted session; and a session spoken out by the user A to the user B is referred to as a delivered session.

SUMMARY

This section provides a general summary of the disclosure, and is not a comprehensive disclosure of its full scope or all of its features.

In an aspect, some embodiments of the disclosure provide a method for adjusting volume of an accepted session on a mobile communication terminal, the method including:

determining, by the mobile communication terminal transmitting a delivered session in communication, a volume decibel value of the delivered session, and a volume decibel level corresponding thereto, wherein the delivered session is a communication session transmitted by the mobile communication terminal; and upon reception of an accepted session, adjusting, by the mobile communication terminal, the volume decibel value of the accepted session to a corresponding target volume decibel value according to a preset mapping relationship between the volume decibel level of the delivered session and the target volume decibel value of the accepted session, wherein the accepted session is a communication session received by the mobile communication terminal.

In another aspect, some embodiments of the disclosure provide a mobile communication terminal including:

a memory configured to store computer readable program codes; and at least one processor configured to execute the computer readable program codes:

to determine while transmitting a delivered session in communication a volume decibel value of the delivered session, and a volume decibel level corresponding thereto, wherein the delivered session is a communication session transmitted by the mobile communication terminal; and upon reception of an accepted session, to adjust the volume decibel value of the accepted session to a corresponding target volume decibel value according to a preset mapping relationship between the volume decibel level of the delivered session and the target volume decibel value of the accepted session, wherein the accepted session is a communication session received by the mobile communication terminal.

In another aspect, some embodiments of the disclosure provide a method for adjusting volume of an accepted session on a mobile communication terminal, the method including:

establishing, by the mobile communication terminal, a communication connection with an opposite device;

detecting a delivered session transmitted by the mobile communication terminal;

when the delivered session is detected, determining a volume decibel level of the delivered session; and upon reception of an accepted session, adjusting, by the mobile communication terminal, automatically a volume decibel value of the accepted session according to the volume decibel level of the delivered session so that the volume decibel value of the accepted session matches the volume decibel level of the delivered session.

Further aspects and areas of applicability will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts or features throughout the several views of the drawings.

DETAILED DESCRIPTION

Example embodiments will now be described more fully with reference to the accompanying drawings.

In some embodiments of the disclosure, a volume reference file characterizing a mapping relationship between a volume decibel level of a delivered session and a target volume decibel value of an accepted session is stored in advance into a mobile communication terminal. While the mobile communication terminal is communicating with another mobile communication terminal, if the mobile communication terminal transmits a session to the other mobile communication terminal, and receives a session returned by the other mobile communication terminal, then the mobile communication terminal may search the mapping relationship between the volume decibel level of the delivered session and the target volume decibel value of the accepted session in the volume reference file for a target volume decibel value of the accepted session corresponding to a volume decibel level of the delivered session transmitted by the mobile communication terminal to the other, and adjust the volume decibel value of the received accepted session to the corresponding target volume decibel value; and if the mobile communication terminal does not transmit any session to the other mobile communication terminal, but receives the accepted session returned by the other mobile communication terminal, then the mobile communication terminal may search the mapping relationship for a target volume decibel value of the accepted session according to the volume decibel level corresponding to a current default volume decibel value of the mobile communication terminal, and adjust the volume decibel value of the received accepted session to the target volume decibel value.

According to the disclosure will be described below in some embodiments thereof, and of course, the disclosure will not be limited to the following embodiments.

Figure 1:
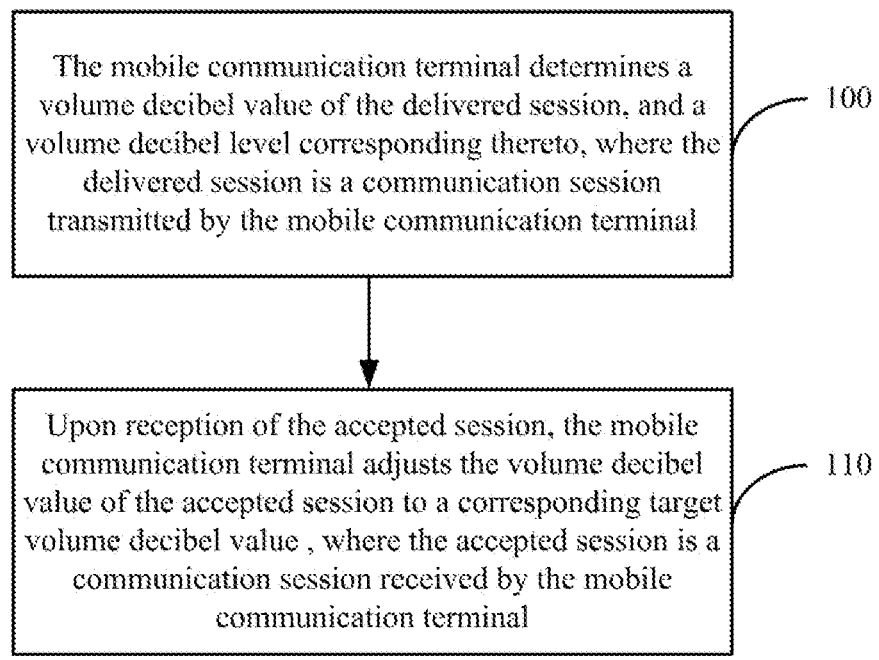
FIG. 1 is a schematic general flow chart of a method for adjusting volume of an accepted session on a mobile communication terminal according to some embodiments of the disclosure.

Referring to FIG. 1, a flow of a method for adjusting volume of an accepted session on a mobile communication terminal according to some embodiments of the disclosure is as follows:

Step 100: the mobile communication terminal transmitting a delivered session in communication determines the volume decibel value of the delivered session, and a volume decibel level corresponding thereto, where the delivered session is a communication session transmitted by the mobile communication terminal.

In some embodiments of the disclosure, in order to enable the mobile communication terminal to adjust the volume decibel value of an accepted session received according to the volume decibel level of accepted delivered session (or a current default volume decibel value) to thereby adjust automatically the volume of the accepted session so as to satisfy different demands of different users, thus further improving the experience of the users, a default volume reference file can be stored in advance in the mobile communication terminal. The volume reference file may include a mapping relationship between a volume decibel level of the delivered session and a target volume decibel value of the accepted session, where the default volume reference file can be generated particularly as follows without any limitation thereto:

A volume testing person makes for each volume decibel level a number of volume experiences respectively in different surrounding environments, determines the target volume decibel value of the accepted session corresponding to each volume decibel level, and records the target volume decibel value of the accepted session corresponding to each volume decibel level, that is, records a mapping relationship between each volume decibel level of the delivered session and each volume decibel value of the accepted session, and particularly the default volume reference file can be generated in the form of a table (as depicted in Table 1) without any limitation thereto:

TABLE 1

| Volume decibel level of session transmitter | Target volume decibel value of session receiver | | |
|---|---|---|---|
| Microphone | headphone | Earphone | Loudspeaker |
| 0-5 db | 5 db | 5 db | 5 db |
| 6-10 db | 10 db | 10 db | 10 db |
| 11-15 db | 15 db | 15 db | 15 db |
| 16-20 db | 20 db | 20 db | 20 db |
| . . . | . . . | . . . | . . . |

In some embodiments of the disclosure, the step 100 can be performed as follows without any limitation thereto:

During communication, when the mobile communication terminal is transmitting the delivered session to the other mobile communication terminal, the session transmitter of the mobile communication terminal (e.g., a microphone, etc.,) may determine the volume decibel value of the delivered session, and a user acoustic characteristic corresponding thereto, and determine whether there is stored a volume reference file corresponding to the user acoustic characteristic according to the user acoustic characteristic, that is, determine whether there is stored a volume reference file of a user himself or herself corresponding the delivered session, and if so, then the session transmitter may search the volume reference file of the user himself or herself for the volume decibel level corresponding to the volume decibel value of the delivered session; otherwise, the session transmitter may search the default volume reference file for the volume decibel level corresponding to the volume decibel value of the delivered session. The volume reference file of the user himself or herself is generated from the default volume reference file stored in advance in the mobile communication terminal using a new target volume decibel value obtained after the user adjusts again the target volume decibel value.

For example, after a call is switched in, when a user A communicates with a user B (a mobile communication terminal 2) through a microphone 1 of a mobile communication terminal 1, that is, the microphone 1 of the mobile communication terminal 1 transmits a delivered session 1 of the user A to the mobile communication terminal 2 of the user B, then the microphone 1 of the mobile communication terminal 1 may determine a volume decibel value of the delivered session 1 (given that the volume decibel value of the delivered session 1 is 8 dB), and then determine whether there is stored a volume reference file A of the user A, and if so, then the mobile communication terminal 1 may search the volume reference file A for a volume decibel level corresponding to the volume decibel value 8 dB of the delivered session 1, i.e., the volume decibel level 6 to 10 dB corresponding to the volume decibel value 8 dB; otherwise, the mobile communication terminal may search a default volume reference file for a volume decibel level corresponding to the volume decibel value 8 dB of the delivered session 1 of the delivered session 1, i.e., the volume decibel level 6 to 10 dB corresponding to the volume decibel value 8 dB.

Step 110: upon reception of the accepted session, the mobile communication terminal adjusts automatically the volume decibel value of the accepted session to a corresponding target volume decibel value according to a preset mapping relationship between the volume decibel level of the delivered session and the target volume decibel value of the accepted session, where the accepted session is a communication session received by the mobile communication terminal.

In some embodiments of the disclosure, the step 110 can be performed as follows without any limitation thereto:

Upon reception of the accepted session returned by another mobile communication terminal, the mobile communication terminal searches a table of the mapping relationship between the volume decibel level of the delivered session and the target volume decibel value of the accepted session in the default volume reference file for the target volume decibel value of the accepted session corresponding to the volume decibel level of the delivered session transmitted by the other mobile communication terminal (if there is stored the volume reference file of the user himself or herself, then the mapping relationship between the volume decibel level of the delivered session and the target volume decibel value of the accepted session in the volume reference file of the user himself or herself may be searched for the target volume decibel value of the accepted session corresponding to the volume decibel level of the delivered session), and adjust the volume decibel value of the received accepted session to the corresponding target volume decibel value, that is, adjust the volume decibel value of the session receiver currently used (which can be but will not be limited to a headphone, an earphone, a loudspeaker, etc.) to the corresponding target volume decibel value.

Further to the example above, for example, the volume reference file A of the user A is not stored, the user A communicates with the user B (the mobile communication terminal 2) using the headphone 1 of the mobile communication terminal 1, and the volume decibel value of the accepted session 1 received by the headphone 1 of the mobile communication terminal 1 is 15 dB.

When the headphone 1 of the mobile communication terminal 1 receives the accepted session 1 returned by the mobile communication terminal 2, the mobile communication terminal 1 searches the table of the default volume reference file for the target volume decibel value of the accepted session corresponding to the volume decibel level 6 to 10 dB of the delivered session 1 (i.e., the corresponding target volume decibel value 10 dB of accepted session is searched out), and adjusts the volume decibel value 15 dB of the accepted session 1 to the target volume decibel value 10 dB.

When the mobile communication terminal 2 receives the delivered session 1 transmitted by the mobile communication terminal 1 (actually the delivered session 1 transmitted by the mobile communication terminal 1 is an accepted session for the mobile communication terminal 2) may also adjust the volume decibel value of the delivered session 1 (actually the delivered session 1 transmitted by the mobile communication terminal 1 is an accepted session for the mobile communication terminal 2) according to the volume decibel level of the accepted session 1 returned to the mobile communication terminal 1 (actually the returned accepted session 1 is a delivered session for the mobile communication terminal 2).

In some embodiments of the disclosure, since there are different hearing capabilities and also habits of respective users, after the mobile communication terminal adjusts automatically the volume decibel value of the session receiver (i.e., the received accepted session) to the corresponding target volume decibel value, the user may further adjust again the volume decibel value of the session receiver (i.e., the received accepted session), and at this time, the mobile communication terminal may determine the current volume decibel value of the session receiver (i.e., the received accepted session) which is adjusted again, as a new target volume decibel value corresponding to the volume decibel level of the delivered session, that is, the mobile communication terminal may update in real time the mapping relationship between the volume decibel level of the delivered session and the target volume decibel value of the accepted session in the volume reference file with the current volume decibel value of the session receiver (i.e., the received accepted session) which is adjusted again to thereby generate the volume reference file of the user himself or herself. Subsequently the mobile communication terminal may adjust the received accepted session based upon the volume reference file of the user himself or herself.

Further to the example above, after the mobile communication terminal 1 adjusts the volume decibel value 15 dB of the headphone 1 (i.e., the received accepted session 1) to the target volume decibel value 10 dB, and upon determining that the user A adjusts again the volume decibel value 10 dB of the headphone 1 to 9 dB, the mobile communication terminal 1 may determine the current volume decibel value 9 dB of the headphone 1 as a new target volume decibel value corresponding to the volume decibel level 6 to 10 dB, that is, update the target volume decibel value 10 dB corresponding to the volume decibel level 6 to 10 dB in the volume reference file to 9 dB, to thereby generate the volume reference file A of the user A.

In some embodiments of the disclosure, there may also be such a case that the mobile communication terminal communicating with the other mobile communication terminal does not transmit any delivered session to the other mobile communication terminal, but receives the accepted session returned by the other mobile communication terminal, and in this case, the mobile communication terminal may firstly determine its current default volume decibel value, and a volume decibel level corresponding thereto, and then adjust the volume decibel value of the received accepted session to a corresponding target volume decibel value according to a mapping relationship between the volume decibel level corresponding to the current default volume decibel value, and the target volume decibel value of the accepted session.

Further to the example above, for example, after the call is switched in, the mobile communication terminal 2 of the user B does not transmit any delivered session to the mobile communication terminal 1 through the microphone 2, but receives the delivered session 1 transmitted by the mobile communication terminal 1 (actually the delivered session 1 transmitted by the mobile communication terminal 1 is an accepted session for the mobile communication terminal 2).

At this time, if the volume decibel value of the delivered session 1, received by the earphone 2 of the mobile communication terminal 2, transmitted by the mobile communication terminal 1 (actually the delivered session 1 transmitted by the mobile communication terminal 1 is an accepted session for the mobile communication terminal 2) is 8 dB, then the mobile communication terminal 2 will firstly determine its current default volume decibel value (for example, the current default volume decibel value of the mobile communication terminal 2 is 15 dB).

Then the mobile communication terminal 2 further searches the volume reference file for a volume decibel level corresponding to the default volume decibel value 15 dB (i.e., the corresponding volume decibel level 11 to 15 dB).

Finally the mobile communication terminal 2 further searches the table of the volume reference file (if there is stored the volume reference file of the user B himself or herself, then the volume reference file will be the volume reference file B; and if there is not stored the volume reference file of the user B himself or herself, then the volume reference file will be the default volume reference file) for the target volume decibel value of the accepted session corresponding to the volume decibel level 11 to 15 dB (i.e., the corresponding accepted session target volume decibel value 15 dB), and adjust the volume decibel value 8 dB of the received delivered session 1 transmitted by the mobile communication terminal 1 (actually the delivered session 1 transmitted by the mobile communication terminal 1 is an accepted session for the mobile communication terminal 2) to the target volume decibel value 15 dB.

Figure 2:
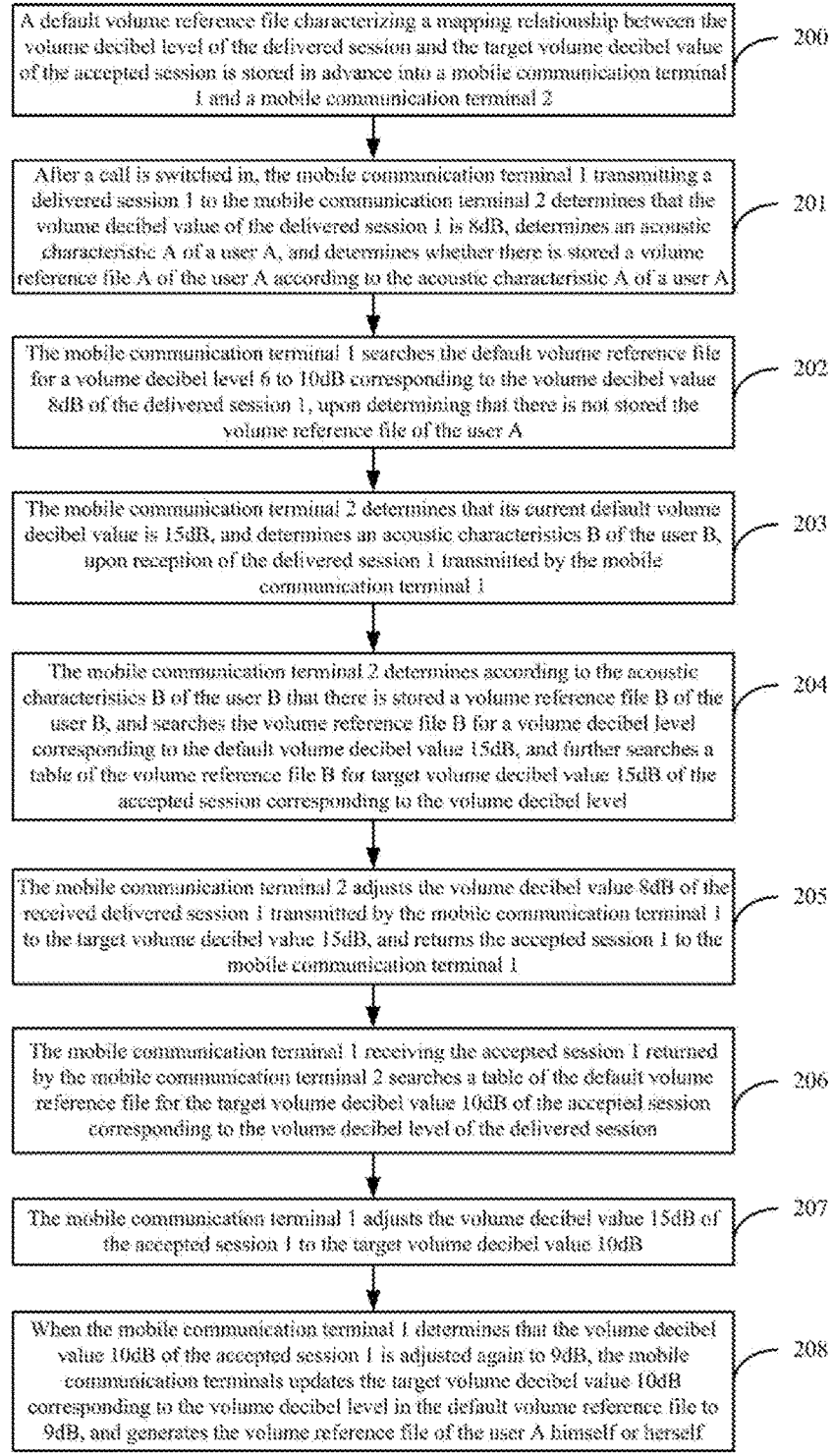
FIG. 2 is a schematic detailed flow chart of a method for adjusting volume of an accepted session on a mobile communication terminal according to some embodiments of the disclosure.

Referring to FIG. 2, in some embodiments, a flow of a method for adjusting volume of an accepted session on a mobile communication terminal, where the method includes:

Step 200: a default volume reference file including a mapping relationship between the volume decibel level of the delivered session and the target volume decibel value of the accepted session is stored in advance into a mobile communication terminal 1 and a mobile communication terminal 2.

Step 201: after a call is switched in, the mobile communication terminal 1 transmitting a delivered session 1 to the mobile communication terminal 2 determines that the volume decibel value of the delivered session 1 is 8 dB, determines an acoustic characteristic A of a user A, and determines whether there is stored a volume reference file A of the user A according to the acoustic characteristic A of a user A.

Step 202: the mobile communication terminal 1 searches the default volume reference file for a volume decibel level 6 to 10 dB corresponding to the volume decibel value 8 dB of the delivered session 1, upon determining that there is not stored the volume reference file of the user A.

Step 203, the mobile communication terminal 2 determines that its current default volume decibel value is 15 dB, and determines an acoustic characteristics B of the user B, upon reception of the delivered session 1 transmitted by the mobile communication terminal 1 (the volume decibel value of the delivered session 1 is 8 dB, and actually the delivered session 1 transmitted by the mobile communication terminal 1 is an accepted session for the mobile communication terminal 2).

Step 204, the mobile communication terminal 2 determines, according to the acoustic characteristics B of the user B, that there is stored a volume reference file B of the user B, and searches the volume reference file B for a volume decibel level 11 to 15 dB corresponding to the default volume decibel value 15 dB, and further searches a table of the volume reference file B for the target volume decibel value 15 dB of the accepted session corresponding to the volume decibel level 11 to 15 dB.

Step 205, the mobile communication terminal 2 adjusts the volume decibel value 8 dB of the received delivered session 1 transmitted by the mobile communication terminal 1 (actually the delivered session 1 transmitted by the mobile communication terminal 1 is an accepted session for the mobile communication terminal 2) to the target volume decibel value 15 dB, and returns the accepted session 1 to the mobile communication terminal 1 (actually the returned accepted session 1 is a delivered session for the mobile communication terminal 2).

Step 206, the mobile communication terminal 1 receiving the accepted session 1 returned by the mobile communication terminal 2 searches a table of the default volume reference file for the target volume decibel value 10 dB of the accepted session corresponding to the volume decibel level 6 to 10 dB of the delivered session.

Step 207, the mobile communication terminal 1 adjusts the volume decibel value 15 dB of the accepted session 1 to the target volume decibel value 10 dB.

Step 208, upon determining that the volume decibel value 10 dB of the accepted session 1 is adjusted again to 9 dB, the mobile communication terminal 1 determines the volume decibel value 9 dB of the accepted session 1 as a new target volume decibel value corresponding to the volume decibel level 6 to 10 dB, that is, updates the target volume decibel value 10 dB corresponding to the volume decibel level 6 to 10 dB in the default volume reference file to 9 dB, and generates the volume reference file of the user A himself or herself.

Figure 3:
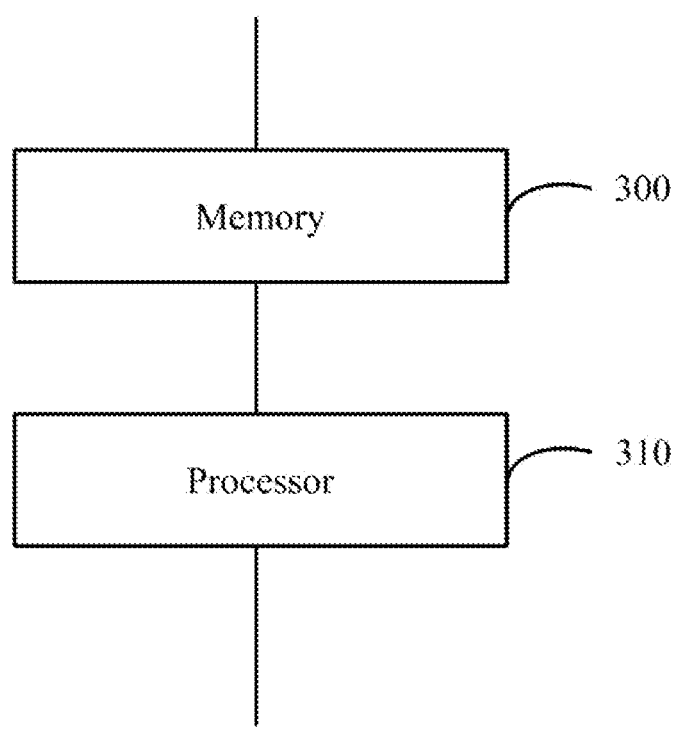
FIG. 3 is a schematic functionally structural diagram of a mobile communication terminal according to some embodiments of the disclosure.

Further to the embodiments of the disclosure, referring to FIG. 3, a mobile communication terminal according to some embodiments of the disclosure includes at least a processor 300 and a memory 310, where the memory stores computer readable program codes, and the processor is configured to execute the computer readable program codes:

To determine while transmitting a delivered session in communication the volume decibel value of the delivered session, and a volume decibel level corresponding thereto, where the delivered session is a communication session transmitted by the mobile communication terminal; and Upon reception of the accepted session, to adjust the volume decibel value of a received accepted session to a corresponding target volume decibel value according to a preset mapping relationship between the volume decibel level of the delivered session and the target volume decibel value of the accepted session, where the accepted session is a communication session received by the mobile communication terminal.

In some embodiments of the disclosure, the processor configured to determine while transmitting the delivered session the volume decibel value of the delivered session, and the volume decibel level corresponding thereto is configured:

To determine while transmitting the delivered session the volume decibel value of the delivered session, and to search a volume reference file for the volume decibel level corresponding to the volume decibel value of the delivered session, where the volume reference file is generated by setting corresponding target volume decibel values of the accepted session for respective volume decibel levels based upon experiences of a user.

In some embodiments of the disclosure, the processor is configured:

Upon reception of the accepted session, to search the mapping relationship between the volume decibel level of the delivered session and the target volume decibel value of the accepted session in the volume reference file for the target volume decibel value of the accepted session corresponding to the volume decibel level of the transmitted delivered session, and to adjust the volume decibel value of the received accepted session to the corresponding target volume decibel value.

In some embodiments of the disclosure, the processor is further configured:

After the volume decibel value of the received accepted session is adjusted to the corresponding target volume decibel value, and upon determining that the adjusted volume decibel value of the accepted session is adjusted again, to determine the volume decibel value of the accepted session which is adjusted again, as a new target volume decibel value corresponding to the volume decibel level of the delivered session.

In some embodiments of the disclosure, the processor is further configured:

If no delivered session is transmitted, but the accepted session is received in communication, to determine a current default volume decibel value of the mobile communication terminal, and a volume decibel level corresponding thereto, and to adjust the volume decibel value of the received accepted session to a corresponding target volume decibel value according to a mapping relationship between the volume decibel level corresponding to the current default volume decibel value, and the target volume decibel value of the accepted session.

Figure 4:
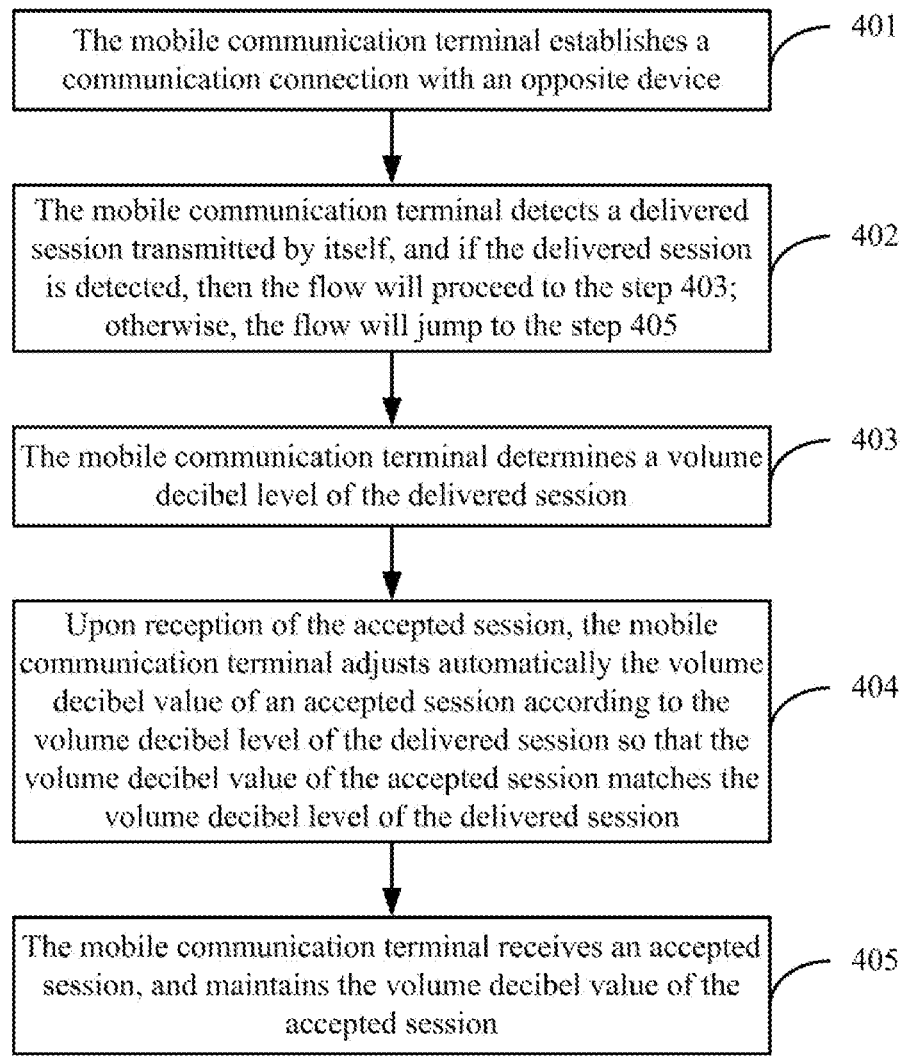
FIG. 4 is a flow chart of another method for adjusting the volume of an accepted session on a mobile communication terminal according to some embodiments of the disclosure.

As illustrated in FIG. 4, an embodiment of the disclosure further provides a method for adjusting volume of an accepted session on a mobile communication terminal, where the method includes:

Step 401: the mobile communication terminal establishes a communication connection with an opposite device;

Step 402, the mobile communication terminal detects a delivered session transmitted by itself, and if the delivered session is detected, then the flow will proceed to the step 403; otherwise, the flow will jump to the step 405;

Step 403, the mobile communication terminal determines a volume decibel level of the delivered session;

Step 404, upon reception of the accepted session, the mobile communication terminal adjusts automatically the volume decibel value of an accepted session according to the volume decibel level of the delivered session so that the volume decibel value of the accepted session matches the volume decibel level of the delivered session; and Step 405, the mobile communication terminal receives an accepted session, and maintains the volume decibel value of the accepted session.

In some embodiments of the disclosure, the mobile communication terminal stores a mapping relationship between the volume decibel level of the delivered session and the target volume decibel value of the accepted session, where a volume testing person can make for each volume decibel level a number of volume experiences respectively in different surrounding environments, determines each target volume decibel value of the accepted session corresponding to each volume decibel level, and records the each target volume decibel value of the accepted session corresponding to the volume decibel level. Moreover in the step 404, the mobile communication terminal adjusts the volume decibel value of the accepted session to the target volume decibel value according to the volume decibel level of the delivered session upon reception of the accepted session.

In some embodiments of the disclosure, as depicted in Table 1, the mapping relationship includes a first sub-mapping relationship, a second sub-mapping relationship, and/or a third sub-mapping relationship; and the target volume decibel value includes a headphone volume decibel value, an earphone volume decibel value, and/or a loudspeaker volume decibel value, where the first sub-mapping relationship can be a relationship between the volume decibel level of the delivered session and a headphone volume decibel value; the second sub-mapping relationship can be a relationship between the volume decibel level of the delivered session and an earphone volume decibel value; and the third sub-mapping relationship can be a relationship between the volume decibel level of the delivered session and a loudspeaker volume decibel value. Moreover the session receiver in the embodiments of the disclosure can include but will not be limited to the headphone, the earphone, the loudspeaker, etc., so the sub-mapping relationships in the embodiments of the disclosure will not be limited to the sub-mapping relationships above either.

In some embodiments of the disclosure, the mobile communication terminal stores a volume reference file in which there is stored a mapping relationship between the volume decibel level of the delivered session and the target volume decibel value of the accepted session (i.e., the mapping relationship above). In the step 403, the mobile terminal transmitting the delivered session determines the volume decibel value of the delivered session, and searches the volume reference file for the volume decibel level corresponding to the volume decibel value of the delivered session. Moreover in the step 404, the mobile communication terminal receiving the accepted session searches the mapping relationship between the volume decibel level of the delivered session and the target volume decibel value of the accepted session in the volume reference file for the target volume decibel value of the accepted session corresponding to the volume decibel level of the transmitted delivered session, and adjusts the volume decibel value of the received accepted session to the corresponding target volume decibel value.

In some embodiments of the disclosure, since there are different hearing capabilities and also habits of respective users, after the mobile communication terminal adjusts automatically the volume decibel value of the session receiver (i.e., the received accepted session) to the corresponding target volume decibel value, the user may further adjust again the volume decibel value of the session receiver (i.e., the received accepted session), and at this time, the mobile communication terminal will determine the current volume decibel value of the session receiver (i.e., the received accepted session) which is adjusted again, as a new target volume decibel value corresponding to the volume decibel level of the delivered session, and update in real time the mapping relationship between the volume decibel level of the delivered session and the target volume decibel value of the accepted session in the volume reference file with the new target volume decibel value to thereby generate the volume reference file of the user himself or herself. Subsequently the mobile communication terminal may adjust the received accepted session based upon the volume reference file of the user himself or herself.

In some embodiments of the disclosure, in a real application, there may also be such a case that the mobile communication terminal communicating with the other mobile communication terminal does not transmit any delivered session to the other mobile communication terminal, but receives the accepted session returned by the other mobile communication terminal, and in this case, the mobile communication terminal can maintain the volume decibel value of the accepted session as in the step 405 (that is, the mobile communication terminal may not adjust the volume decibel value of the accepted session). In some embodiments of the disclosure, the mobile communication terminal can alternatively determine its current default volume decibel value, and a volume decibel level corresponding thereto, and adjust the volume decibel value of the received accepted session to a corresponding target volume decibel value according to a mapping relationship between the volume decibel level corresponding to the current default volume decibel value, and the target volume decibel value of the accepted session.

Figure 5:
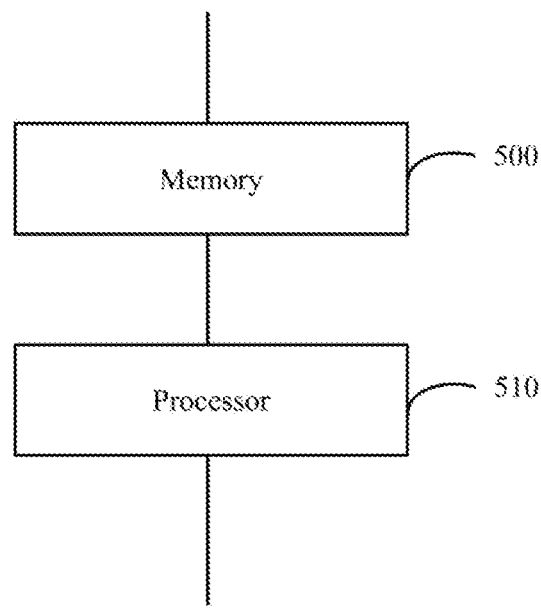
FIG. 5 is a schematic structural diagram of a mobile communication terminal according to some embodiments of the disclosure.

Based upon the same idea as the method illustrated in FIG. 4 above, an embodiment of the disclosure further provides a mobile communication terminal as illustrated in FIG. 5, where the mobile communication terminal includes a processor 500 and a memory 510, where the memory stores therein computer readable program codes, and the processor is configured to execute the computer readable program codes:

To establish a communication connection with an opposite device;

To detect a delivered session transmitted by the mobile communication terminal;

When the delivered session is detected, to determine a volume decibel level of the delivered session; and Upon reception of an accepted session, to adjust automatically a volume decibel value of the accepted session according to the volume decibel level of the delivered session so that the volume decibel value of the accepted session matches the volume decibel level of the delivered session.

The mobile communication terminal stores a mapping relationship between the volume decibel level of the delivered session and a target volume decibel value of the accepted session; and The processor configured to adjust automatically the volume decibel value of the accepted session according to the volume decibel level of the delivered session so that the volume decibel value of the accepted session matches the volume decibel level of the delivered session is configured:

To adjust the volume decibel value of the accepted session to the target volume decibel value according to the volume decibel level of the delivered session.

The mapping relationship includes a first sub-mapping relationship, a second sub-mapping relationship, and/or a third sub-mapping relationship;

The target volume decibel value includes a headphone volume decibel value, an earphone volume decibel value, and/or a loudspeaker volume decibel value;

The first sub-mapping relationship is a relationship between the volume decibel level of the delivered session and a headphone volume decibel value;

The second sub-mapping relationship is a relationship between the volume decibel level of the delivered session and an earphone volume decibel value; and The third sub-mapping relationship is a relationship between the volume decibel level of the delivered session and a loudspeaker volume decibel value.

Where the mobile communication terminal stores therein a volume reference file in which there is stored the mapping relationship between the volume decibel level of the delivered session and the target volume decibel value of the accepted session; and The processor configured to determine the volume decibel level of the delivered session is configured:

To determine while transmitting the delivered session the volume decibel value of the delivered session, and to search the volume reference file for the volume decibel level corresponding to the volume decibel value of the delivered session.

Where the processor configured to adjust the volume decibel value of the accepted session to the target volume decibel value according to the volume decibel level of the delivered session is configured: upon reception of the accepted session, to search the mapping relationship between the volume decibel level of the delivered session and the target volume decibel value of the accepted session in the volume reference file for the target volume decibel value of the accepted session corresponding to the volume decibel level of the transmitted deliver session, and to adjust the volume decibel value of the received accepted session to the corresponding target volume decibel value.

The processor is further configured:

After the volume decibel value of the received accepted session is adjusted to the corresponding target volume decibel value, and upon determining that the adjusted volume decibel value of the accepted session is adjusted again, to determine the volume decibel value of the accepted session which is adjusted again, as a new target volume decibel value corresponding to the volume decibel level of the delivered session.

The processor is further configured:

To determine that the mobile communication terminal does not transmit any delivered session, but the mobile communication terminal receives the accepted session, and to maintain the volume decibel value of the accepted session.

The processor is further configured:

To determine a current default volume decibel value of the mobile communication terminal, and a volume decibel level corresponding thereto, and to adjust the volume decibel value of the received accepted session to the corresponding target volume decibel value according to a mapping relationship between the volume decibel level corresponding to the current default volume decibel value, and the target volume decibel value of the accepted session.

Figure 6:
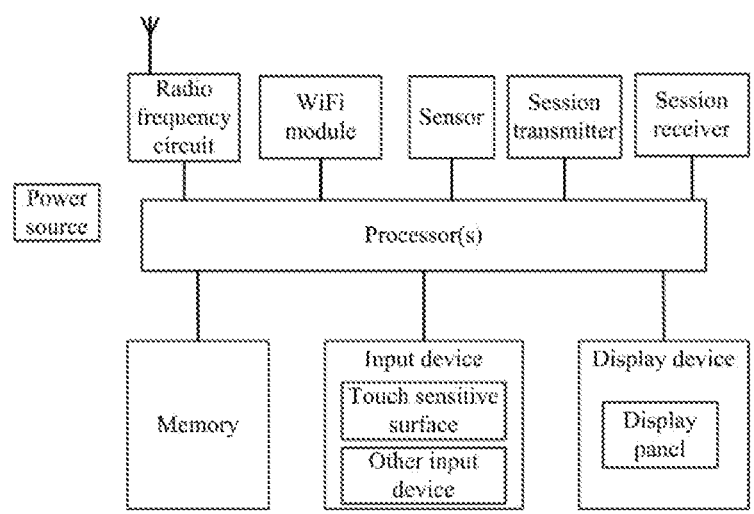
FIG. 6 is a schematic structural diagram of a mobile communication terminal according to some embodiments of the disclosure.

As illustrated in FIG. 6, some embodiments of the disclosure further provide a mobile communication terminal which can be any one of various handheld devices capable of communication (e.g., a mobile phone, an IPAD, etc.), which can include a processor including one or more processing cores, a radio frequency circuit, a memory including one or more computer readable storage mediums, an input device, a display device, a sensor, a session transmitter, a session receiver, a WiFi module, a power source, and other components. Those skilled in the art can appreciate that the structure of the mobile communication terminal in this embodiment will not be intended to be limiting, but can include more or less components, or have some of the components combined, or include different components arranged, where:

The radio frequency circuit can be configured to receive and transmit a signal in the course of receiving and transmitting information or in communication, particularly by transferring downlink information of a base station to the one or more processors for processing upon reception of the downlink information; and also transmitting uplink data to the base station. Typically the radio frequency circuit includes but will not be limited to an antenna, at least one amplifier, a tuner, one or more oscillators, a Subscriber Identifier Module (SIM) card, a transceiver, a coupler, a Low Noise Amplifier (LNA), a duplexer, etc. Moreover the radio frequency circuit can further communicate with a network and another device through wireless communication. The wireless communication can comply with any of communication standards or protocols including but not limited to the GSM (Global System of Mobile communication), the GPRS (General Packet Radio Service), the CDMA (Code Division Multiple Access), the WCDMA (Wideband Code Division Multiple Access), the LTE (Long Term Evolution), an e-mail, the SMS (Short Messaging Service), etc.

The memory can be configured to store software programs and modules, and the processor can be configured to run the software programs and modules stored in the memory to thereby perform various function applications and data processing. The memory can generally include a program storage area and a data storage area, where an operating system, applications required for at least one function (e.g., an audio playing function, an image playing function, etc.), etc., can be stored in the program storage area; and data created for use of the mobile communication terminal (e.g., audio data, a phone book etc.), etc., can be stored in the data storage area. Additionally the memory can include a high-speed random access memory, and can further include a nonvolatile memory, e.g., at least one magnetic-disk memory device, a flash memory device or another volatile solid memory device. Correspondingly the memory can further include a memory controller configured to provide an access of the processor and the input device to the memory.

The input device can be configured to receive input digital or character information and to generate a keyboard, a mouse, a joystick, or an optical or track ball signal input related to user setting and function control. Particularly the input device can include a touch sensitive surface and another input device. The touch sensitive surface, also referred to as a touch display screen or a touch control pad, can be configured to collect a touch operation by a user thereon or in proximity thereto (e.g., an operation by the user on or in proximity to the touch sensitive surface using his or her finger, a stylus or any other appropriate object or attachment), and to drive a corresponding connected device by preset program. Optionally the touch sensitive surface can include two components which are a touch detection device and a touch controller, where the touch detection device detects the position of touching by the user, detects a signal as a result of the touch operation, and transfers the signal to the touch controller; and the touch controller receives the touch signal from the touch detection device and converts it into coordinates of a touch point and further transfers them to the processor, and can receive and execute a command sent by the processor. Moreover the touch sensitive surface can be embodied in various types of resistive, capacitive, infrared, surface sound wave and other types. The input device can further include another input device in addition to the touch sensitive surface. Particularly the other input device can include but will not be limited to one or more of a physical keyboard, functional keys (e.g., volume control buttons, a power-on or-off button, etc.), a track ball, a mouse, a joystick, etc.

The display device can be configured to display information input by the user or information provided to the user and various graphic user interfaces of the mobile communication terminal, where these graphic user interfaces can be composed of graphics, texts, icons, videos and any combination thereof. The display device can include a display panel which can be optionally configured in the form of a Liquid Crystal Display (LCD), an Organic Light-Emitting Diode (OLED) display, etc. Furthermore the touch sensitive surface can overlie the display panel, and the touch sensitive surface, upon detection of the touch operation thereon or in proximity thereto, transfers it to the processor to determine the type of the touch event, and thereafter the processor provides a corresponding visual output on the display panel according to the type of the touch event. Although the touch sensitive surface and the display device are embodied in this embodiment as two separate components to perform the input and output functions, the touch sensitive surface and the display device can be integrated to perform the input and output functions in some embodiments.

The mobile communication terminal can further include at least one sensor, e.g., an optical sensor, a motion sensor, and other sensors. Particularly the optical sensor can include an ambient optical sensor and a proximity sensor, where the ambient optical sensor can adjust the brightness of the display panel according to the luminosity of ambient light rays, and the proximity sensor can power off the display panel and/or a backlight when the mobile communication terminal moves in proximity to an ear. A gravity acceleration sensor which is a motion sensor can detect the magnitudes of accelerations in respective directions (typically three axes), can detect the magnitude and the direction of gravity when the sensor is stationary, and can be configured to perform applications of identifying the posture of a handset (e.g., switching between landscape and portrait modes, relevant games, calibration of the posture of a magnetometer, etc.), a relevant function of identifying vibration (e.g., a pedometer, a knock, etc.), etc.; and the mobile communication terminal can be further configured with a gyroscope, a barometer, a hygrometer, a thermometer, an infrared sensor and other sensors, although a repeated description of these components will be omitted here.

The session transmitter and the session receiver can provide communication between the user and the mobile communication terminal. The session transmitter can acquire and convert an acoustic signal into audio data, and further input the audio data to the processor for processing, and the processor can further transmit the audio data to another device through the radio frequency circuit, or output the audio data to the memory for further processing. The session receiver can convert received audio data into an acoustic signal, and output the acoustic signal. In this embodiment, reference can be made to the description in FIG. 3 for particular functions of the session transmitter and the session receiver, although a repeated description thereof will be omitted here.

The WiFi falls into the category of short-range wireless transmission technologies, and the mobile communication terminal can assist the user in receiving and transmitting an e-mail, browsing a webpage, accessing streaming media, etc., through the WiFi module by which the user is provided with a wireless access to the broadband Internet. Although the WiFi module is illustrated in this embodiment, it can be appreciated that it may not be necessarily required for the mobile communication terminal, but can be omitted as desired without departing from the scope of the disclosure.

The processor is a control component of the mobile communication terminal, has the respective components connected by various interfaces and lines, and runs or executes the software programs and/or modules stored in the memory, and invokes the data stored in the memory to perform the various functions of the mobile communication terminal and process the data to thereby manage and control the mobile communication terminal as a whole. Optionally the processor can include one or more processing cores; and preferably the processor can be integrated with an application processor and a modem processor, where the application processor generally handles the operating system, the user interfaces, the applications, etc., and the modem processor generally handles wireless communication. As can be appreciated, the modem processor above may not be integrated into the processor.

The mobile communication terminal further includes a power source (e.g., a battery) powering the respective components, and in some embodiments of the disclosure, the power source can be logically connected with the processor through a power management system to thereby perform charging and discharging management, power consumption management, etc., through the power management system. The power source can further include one or more DC or AC power sources, recharging systems, power source failure detection circuits, power source transformers or inverters, power source status indicators, and any other components.

Although not illustrated, the mobile communication terminal can further include a webcam, a Bluetooth module, etc., though a repeated description thereof will be omitted here.

In another embodiment of the disclosure, there is provided a storage medium (including but not limited to a magnetic-disk memory, a CD-ROM, an optical memory, etc.) in which there are stored instruction codes, where these instruction codes can perform the method in FIG. 1, FIG. 2, or FIG. 4 upon being executed.

In summary, in the embodiments of the disclosure, the mobile communication terminal transmitting the delivered session determines the volume decibel value of the delivered session, and the volume decibel level corresponding thereto, and the mobile communication terminal receiving the accepted session adjusts the volume decibel value of the received accepted session to the corresponding target volume decibel value according to the preset mapping relationship between the volume decibel level of the delivered session and the target volume decibel value of the accepted session, so that when the preset mapping relationship between the volume decibel level of the delivered session and the target volume decibel value of the accepted session is stored into the mobile communication terminal, the mobile communication terminal can adjust automatically the volume decibel value of the received accepted session according to the volume decibel level of the delivered session transmitted by the mobile communication terminal to thereby improve the experience of the user.

Furthermore the mobile communication terminal determines the current volume decibel value of the accepted session which is adjusted again as the new target volume decibel value corresponding to the volume decibel level of the delivered session, so that the mobile communication terminal receiving the accepted session again can adjust the volume decibel value of the accepted session received again to the corresponding new target volume decibel value to thereby further guarantee a good experience of the user.

Those skilled in the art shall appreciate that the embodiments of the disclosure can be embodied as a method, a system or a computer program product. Therefore the disclosure can be embodied in the form of an all-hardware embodiment, an all-software embodiment or an embodiment of software and hardware in combination. Furthermore the disclosure can be embodied in the form of a computer program product embodied in one or more computer useable storage mediums (including but not limited to a disk memory, a CD-ROM, an optical memory, etc.) in which computer useable program codes are contained.

The disclosure has been described in a flow chart and/or a block diagram of the method, the device (system) and the computer program product according to the embodiments of the disclosure. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A method for adjusting volume of an accepted session on a mobile terminal, the method comprising:
    determining a volume decibel value of a delivered session in a conversation sent by the mobile terminal;
    determining a volume decibel level of the delivered session according to the volume decibel value of the delivered session;
    adjusting a volume decibel value of an accepted session in the conversation received by the mobile terminal to a target volume decibel value according to a preset mapping relationship between the volume decibel level of the delivered session and the target volume decibel value of the accepted session; and
    after adjusting the volume decibel value of the accepted session to the target volume decibel value and upon determining that the adjusted volume decibel value of the accepted session is adjusted again by a user, determining the volume decibel value of the accepted session adjusted again by the user, as a new target volume decibel value corresponding to the volume decibel level of the delivered session.

2. The method according to claim 1, wherein determining the volume decibel level of the delivered session comprises:
    searching in a volume reference file for the volume decibel level corresponding to the volume decibel value of the delivered session, wherein the volume reference file comprises a mapping relationship between the volume decibel value of the delivered session and the corresponding volume decibel level.

3. The method according to claim 1, wherein adjusting the volume decibel value of the accepted session to the corresponding target volume decibel value according to the preset mapping relationship comprises:
    searching the preset mapping relationship in a volume reference file, wherein the volume reference file is generated by setting corresponding target volume decibel values of accepted sessions for respective volume decibel levels based upon experiences of a user.

4. The method according to claim 1, wherein the delivered session is a communication session received by a microphone of the mobile terminal and sent out in the conversation by the mobile terminal.

5. The method according to claim 1, wherein the accepted session is a communication session received by the mobile terminal and played by a phone receiver of the mobile terminal.

6. The method according to claim 5, wherein the phone receiver comprises at least one of a headphone, an earphone, and a loudspeaker.

7. The method according to claim 1, wherein the target volume decibel value of the accepted session is positively correlated with the volume decibel value of the delivered session.

8. A mobile terminal comprising:
a memory configured to store computer readable program codes; and
at least one processor configured to execute the computer readable program codes to:
determine a volume decibel value of a delivered session in a conversation sent by the mobile terminal;
determine a volume decibel level of the delivered session according to the volume decibel value of the delivered session;
adjust a volume decibel value of an accepted session in the conversation received by the mobile terminal to a target volume decibel value according to a preset mapping relationship between the volume decibel level of the delivered session and the target volume decibel value of the accepted session; and
after adjusting the volume decibel value of the accepted session to the target volume decibel value and upon determining that the adjusted volume decibel value of the accepted session is adjusted again by a user, determine the volume decibel value of the accepted session adjusted again by the user as a new target volume decibel value corresponding to the volume decibel level of the delivered session.

9. The mobile terminal according to claim 8, wherein the at least one processor is further configured to execute the computer readable program codes to search in a volume reference file for the volume decibel level corresponding to the volume decibel value of the delivered session, wherein the volume reference file comprises a mapping relationship between the volume decibel value of the delivered session and the corresponding volume decibel level.

10. The mobile terminal according to claim 8, wherein the at least one processor is further configured to execute the computer readable program codes to search the preset mapping relationship in a volume reference file, wherein the volume reference file is generated by setting corresponding target volume decibel values of accepted sessions for respective volume decibel levels based upon experiences of a user.

11. The mobile terminal according to claim 8, wherein the delivered session is a communication session configured to be received by a microphone of the mobile terminal and sent out in the conversation by the mobile terminal.

12. The mobile terminal according to claim 8, wherein the accepted session is a communication session configured to be received by the mobile terminal and played by a phone receiver of the mobile terminal.

13. The mobile terminal according to claim 12, wherein the phone receiver comprises at least one of a headphone, an earphone and a loudspeaker.

14. The mobile terminal according to claim 8, wherein the target volume decibel value of the accepted session is positively correlated with the volume decibel value of the delivered session.

15. A method for adjusting volume of an accepted session on a mobile terminal, the method comprising:
establishing, by the mobile terminal, a communication connection with an opposite device;
determining a volume decibel level of a delivered session sent by the mobile terminal to the opposite device;
adjusting a volume decibel value of an accepted session received by the mobile terminal from the opposite device to a target volume decibel value according to the volume decibel level of the delivered session and a mapping relationship between the volume decibel level of the delivered session and the target volume decibel value of the accepted session; and
after adjusting the volume decibel value of the received accepted session to the corresponding target volume decibel value and upon determining that the adjusted volume decibel value of the accepted session is adjusted again by a user, determining, by the mobile terminal, the volume decibel value of the accepted session adjusted again by the user, as a new target volume decibel value corresponding to the volume decibel level of the delivered session.

16. The method according to claim 15, wherein the mapping relationship comprises at least one of a first sub-mapping relationship, a second sub-mapping relationship, and a third sub-mapping relationship, wherein the target volume decibel value comprises at least one of a headphone volume decibel value, an earphone volume decibel value, and a loudspeaker volume decibel value, wherein the first sub-mapping relationship is a relationship between the volume decibel level of the delivered session and a headphone volume decibel value, wherein the second sub-mapping relationship is a relationship between the volume decibel level of the delivered session and an earphone volume decibel value, and wherein the third sub-mapping relationship is a relationship between the volume decibel level of the delivered session and a loudspeaker volume decibel value.

17. The method according to claim 15, wherein the mobile terminal stores a volume reference file to store the mapping relationship between the volume decibel level of the delivered session and the target volume decibel value of the accepted session, and wherein determining the volume decibel level of the delivered session comprises determining a volume decibel value of the delivered session, and searching in the volume reference file for the volume decibel level corresponding to the volume decibel value of the delivered session.

18. The method according to claim 15, further comprising searching the mapping relationship between the volume decibel level of the delivered session and the target volume decibel value of the accepted session in a volume reference file.

* * * * *